United States Patent
Schobel et al.

[15] 3,665,147
[45] May 23, 1972

[54] DEVICE FOR ELECTRICAL PROTECTIVE GAS WELDING

[72] Inventors: Karl Schobel, Frankfurt am Main; Werner Becker, Bornheimer, both of Germany

[73] Assignee: Messer Griesheim GmbH, Frankfurt am Main, Germany

[22] Filed: Mar. 18, 1970

[21] Appl. No.: 20,653

Related U.S. Application Data

[63] Continuation-in-part of Ser. No. 643,862, June 6, 1967.

[30] Foreign Application Priority Data

June 10, 1966 Germany..............................M 69793

[52] U.S. Cl. ...........................................219/131 R, 219/130
[51] Int. Cl........................................................B23k 9/10
[58] Field of Search..................................219/131, 135, 130

[56] References Cited

UNITED STATES PATENTS

| | | |
|---|---|---|
| 2,620,423 | 12/1952 | Komers et al.......................219/130 X |
| 3,324,379 | 6/1967 | Mulder..................................219/131 |
| 3,475,585 | 10/1969 | Pierce...................................219/131 |

Primary Examiner—J. V. Truhe
Assistant Examiner—J. G. Smith
Attorney—Connolly and Hutz

[57] ABSTRACT

An electrical protective gas welding device for seam welding a plurality of layers together with different thickness wires mounts both the wire supply devices and the corresponding torches on the same electrical equipment housing for sequential operation thereof.

2 Claims, 3 Drawing Figures

DEVICE FOR ELECTRICAL PROTECTIVE GAS WELDING

CROSS-REFERENCE TO RELATED APPLICATION

This application is a continuation-in-part of copending application Ser. No. 643,862, filed June 6, 1967.

BACKGROUND OF INVENTION

Welding of steel plates of average or great thickness is carried out in a multilayered manner. In MIG welding with argon, mixed gas or $CO_2$, the first layer, called the root layer, is usually welded by the short electric arc welding process with thin wire of 0.8 to 1.0 mm thickness. The thin wire is necessary because a thicker wire would require an exceedingly high current and an exceedingly high heat introduction. If, however, the following cover layers were welded with the same thin wire, the work would be too costly and thus uneconomical. Where a thicker wire is used, for example of 1.6 mm diameter, either the present welding equipment must be changed, i.e. changing welding torch, wire conveying tube, wire roll, nozzles, as well as the conveying rollers, or it necessarily involves switching to a second operational equipment. Either alternative results in disadvantageous complicated and time-consuming change-overs or investment costs.

SUMMARY OF INVENTION

An object of this invention is to avoid the aforesaid disadvantages and to achieve still further advantages described below.

In accordance with this invention the welding torches corresponding to the various wire thicknesses and the coordinated wire supply devices are linked together to one and the same electrical equipment or current source.

Such a combination equipment advantageously allows the immediate conversion from the root face seam without changeover. In addition, there is a saving in further electrical equipment such as rectifiers or converters, in contrast to prior welding devices which are individually arranged for each torch, since with this invention a single set of equipment suffices for all torches and wire thicknesses.

The electrical equipment could for example be designed in such a manner that for each wire thickness there is prearranged a certain welding arc voltage and a certain wire advance which can be switched on by simply pressing a corresponding button. In the sense of a multilateral utilization of the device, it is preferred, however, that the electrical equipment be adjustable to various welding wire or rod thicknesses in view of welding arc voltage and wire advance.

In this connection, it is further proposed that for each welding wire thickness there be arranged a wire advance device and switch for the preselection of the welding arc voltage and of the wire advance and that the switching on of the preselected values as well as the polarity reversal of the positive pole to the corresponding torch take place by means of a main switch which inactivates one torch when the other is activated.

For the preselection of the welding arc voltage there is preferably provided a pair of switches for the coarse and fine stepping. For the adjusting of the wire advance, a control button is suitable. The wire advance devices can basically be constructed in any desired manner. For this conventional types of construction are recommended, for example slide, carriage or box form. The wire advance devices or reels are suitably equipped with a bearing pulley for each of the welding rods and can be activated by a control device. Alternatively, because of economy reasons it is preferably proposed that the wire advance devices be activated by a common control device.

The torch construction should be suited to the individual utilization purpose. Thus, it is recommended, for example, that for the relatively small wire thickness for a root face seam there is arranged an air cooled torch, and for the wire thickness for the cover layers there is arranged a water-cooled torch.

Furthermore, it is of course possible to equip the inventive device with further known elements, such as relays for the wire follow-up after switching off, reversing switch welding-attachment, device for the protective gas pre- and after-streaming.

THE DRAWINGS

FIG. 1 illustrates an embodiment of the invention by way of a MIG welding equipment for two different wire thicknesses; and FIG. 2 is a schematic showing of the controls for the arrangement of FIG. 1.

DETAILED DESCRIPTION

The inventive arrangement has particular utility in MIG welding wherein a weld seam is prepared consisting of several layers welded with wires of various thicknesses. For example weldings on plates of medium and great thickness are made multilayered. In this connection, the first or root layer is welded with a thin wire of about 0.8-1 mm thickness. A thicker wire would require an excessively high current and consequently an excessively high heat production. However, if the subsequent covering layers are welded with the same thin wire, the work becomes uneconomical. With the prior art devices it is impossible, without longer changeover times, to weld a thicker wire of for example 1.6 mm diameter with the same welding equipment. Moreover, in the known devices, the welding torch, wire conveying hose, wire reel, as well as the conveying rollers of the wire advance device must be interchanged or it is necessary to change over to a second operational welding apparatus equipped for a larger diameter.

In addition, after welding the first or root layer with the thin wire, the current source must be adjusted by an expert to the new values (for the thick wire). Especially in mass production of small parts this means that the change-over times would make up a considerable portion of the total welding time. It is seldom possible in mass production to first produce the root layer on all parts and subsequently the covering layer on all parts, since parts to be welded are often bulky or must be secured in a clamping device during the welding process. Especially in assembly work it is necessary to produce the weld seam completely, i.e. to finish first the root layer and then the covering layer.

Figure 1:
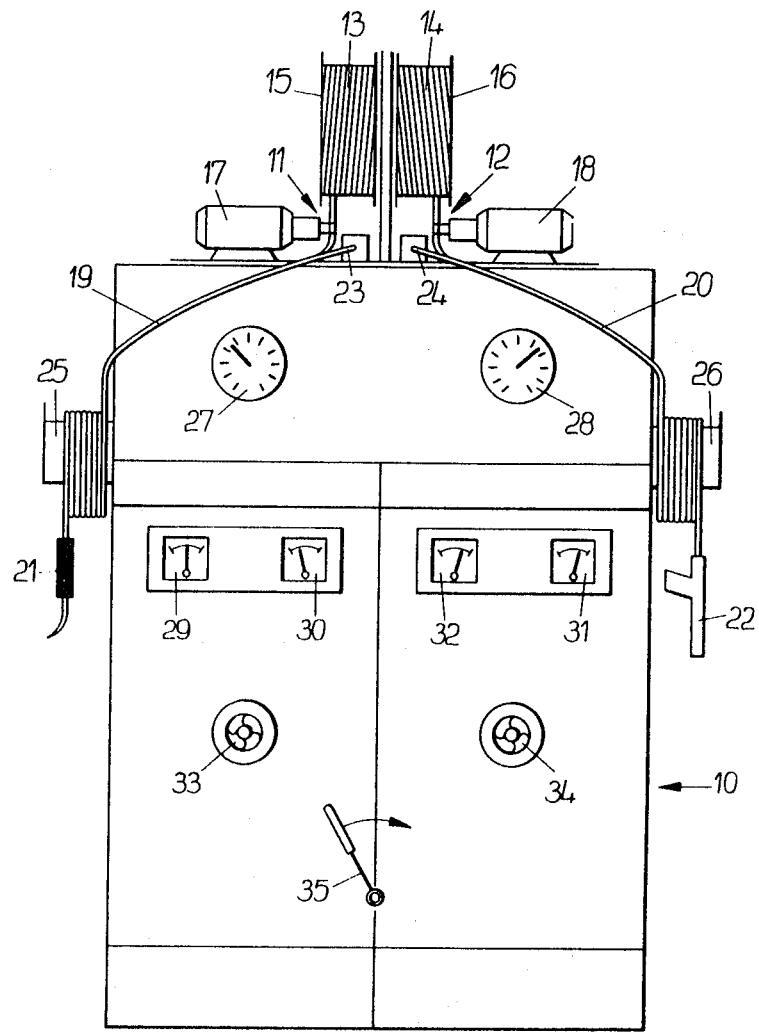

FIG. 1 illustrates a simple device for the electric protective gas welding by means of which welding in sequence of the root and the covering layers is possible without long changeover times.

The common electrical equipment, for example a welding rectifier or converter and the current source is designated with 10. It is constructed in the shape of a box or housing and on its surface has advance devices 11 and 12 for wires 13 and 14 for the root face seam welding and the cover layer welding. The welding rods 13 and 14 are wound on bearing pulleys 15 and 16 whereby the wire advance is directly effected by motors 17 and 18 respectively and reach the torches 21 (or $B_1$) and 22 (or $B_2$) by means of tubes 19 and 20. Tubes 19, 20 serve at the same time for conducting the welding current cables 23 and 24 as well as for cooling air or water conduction to the torches 21, 22. The tube ends are wound on lugs 25, 26.

The electrical equipment 10 is equipped with measuring instruments 27, 28 for the welding current and voltage. A switching pair 29, 30 and 31, 32 for the preselection of the welding voltage in coarse and fine stepping is arranged for each welding torch, i.e. for each wire thickness. A control button 33 and 34 serves for the advance-preselection of the particular wire. The preselected welding voltage and wire advance values can be switched on by means of main switch 35. In the position of switch 35 shown in the drawing, the corresponding values are switched on for the root face welding, i.e. torch 21 can be set in operation, while torch 22 is rendered inactivated. The position of switch 35 controls which of the torches is activated or inactivated. As long as one of the torches is water-cooled, switch 35 can simultaneously serve for the switching on and off of the water pump.

Figure 2:
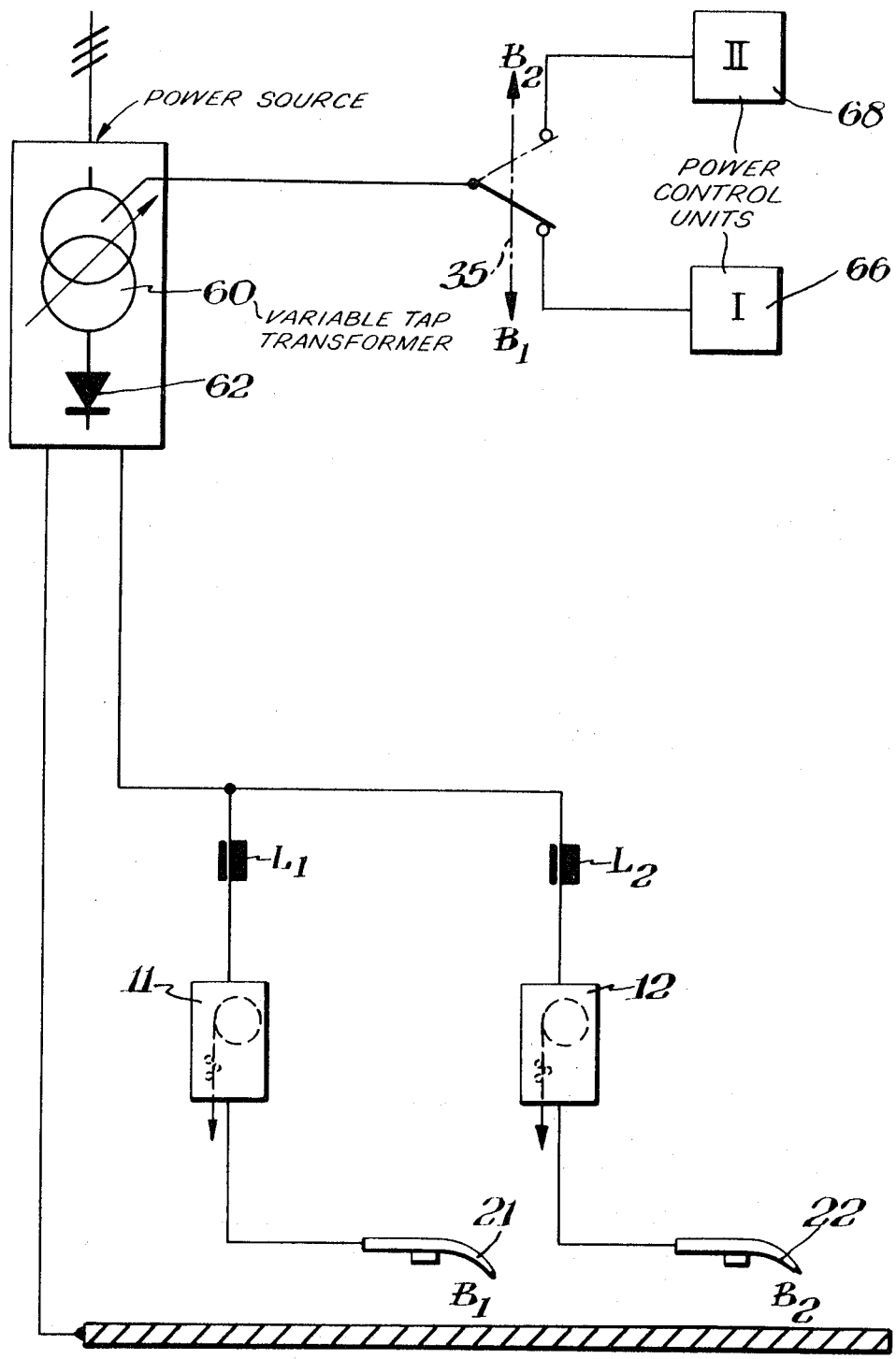

The arrangement shown in FIG. 2 includes as its power source a three-phase transformer 60, suitably of the variable tap type, and a rectifier part 62. Program selectors 66 and 68 as well as torches 21 and 22 with the corresponding wire advances 11 or 12 are also provided. At program selectors 66 and 68 the necessary current and voltage values are set for torches 21 or 22.

A main switch 35 orders the particular program, and furthermore the corresponding wire advance 11 or 12 is switched on. By means of the position of the main switch 35, illustrated in the sketch, a program selector 66 is connected with the affects the primary winding 1 of the transformer 60, whereby the program selector acts as a preset control device for actuating the transformer taps in a conventional manner. By means of the position of switch 35 the wire advance 11 is switched on so that the torch 21 is operational for the root layer welding. By throwing switch 35, the program selector 68 is governing and the covering layer welding may be carried out with torch 22.

Thus the inventive arrangement utilizes the concept that at one single current supply unit (transformer and rectifier part), two different torches are connected independent of each other, and the torches are constructed for different welding areas and are only usable separately from each other. With the aid of the novel device, it is possible to carry out different weldings, which for example are required in sequence for one or several work pieces. If for example a series welding is carried out with the novel device, the operator only has to pick up the other torch and to switch on at the current source the other preset values by means of the main switch. The novel device thus allows advantageously the immediate transition from root layer welding to the covering layer welding without change-over. A further advantage is that the adjustment for the root layer welding and also for the covering layer welding need only once be undertaken by skilled personnel, and the actual welding work may be carried out by auxiliary personnel.

The above-described embodiment illustrated in the drawings, serves for clarifying the invention, which of course is not limited to this example. There are furthermore numerous variations without thereby departing from the scope of the invention. For example instead of two sets of controls for the two torches a single common control can be selectively switched for controlling each torch.

What is claimed is:

1. A device for MIG-welding of weld seams welded with wires of different thicknesses comprising a first welding torch for welding with relatively thin diameter wire, a supply of thin diameter wire, first wire advance means for feeding said thin diameter wire to said first torch, first control means for preselecting the welding voltage and the welding current and the wire feed for said first torch in accordance with the wire thickness, said first control means being electrically connected with said first torch for permitting said first torch to perform a welding operation when said first control means is actuated, a second welding torch for welding with relatively thick diameter wire, a supply of thick diameter wire, second wire advance means for feeding said thick diameter wire to said second torch, second control means for preselecting the welding voltage and the welding current and the wire feed for said second torch in accordance with the wire thickness, said second control means being electrically connected with said second torch for permitting said second torch to perform a welding operation when said second control means is actuated, a single current source for selectively supplying the electrical power to said first and said second control means, and a single main switch connected to said single current source and selectively connectable to said first and said second control means one at a time in such a manner that said first control means and its torch are actuated only when said second control means and its torch are inactivated and said second control means and its torch are actuated only when said first control means and its torch are inactivated.

2. A device as set forth in claim 1 wherein said first and second control means includes a three-phase transformer connected to a rectifier and a program switch which comprise a power source, said power source being selectively connectable by said main switch to a program selector for each of said torches, and said wire advance means and torches being connected to said transformer.

* * * * *